United States Patent
Van De Kreeke et al.

(10) Patent No.: US 6,928,340 B2
(45) Date of Patent: Aug. 9, 2005

(54) PROCESS AND SYSTEM FOR MOVING A CONTROL SURFACE OF AN AIRCRAFT

(75) Inventors: Marc Van De Kreeke, Leguevin (FR); Guillaume Cassein, Toulouse (FR)

(73) Assignee: Airbus France, Toulouse (FR)

( * ) Notice: Subject to any disclaimer, the term of this patent is extended or adjusted under 35 U.S.C. 154(b) by 78 days.

(21) Appl. No.: 10/654,621

(22) Filed: Sep. 4, 2003

(65) Prior Publication Data

US 2004/0111190 A1 Jun. 10, 2004

(30) Foreign Application Priority Data

Sep. 9, 2002 (FR) .......................................... 02 11124

(51) Int. Cl.$^7$ ................................................. G05D 1/00
(52) U.S. Cl. ........................... 701/4; 701/14; 244/75 R
(58) Field of Search .............................. 701/3, 4, 11, 14, 701/16; 244/75 R, 76 R, 181, 178, 191, 195, 194

(56) References Cited

U.S. PATENT DOCUMENTS

| 5,170,969 | A | | 12/1992 | Lin |
| 5,375,794 | A | * | 12/1994 | Bleeg ......................... 244/76 C |
| 6,209,825 | B1 | | 4/2001 | Scott |
| 6,338,454 | B1 | | 1/2002 | Rollet et al. |
| 6,539,290 | B1 | * | 3/2003 | Vos ............................... 701/3 |
| 2002/0022910 | A1 | | 2/2002 | Kubica et al. |

FOREIGN PATENT DOCUMENTS

FR          2809373          11/2001

* cited by examiner

*Primary Examiner*—Richard M. Camby
(74) *Attorney, Agent, or Firm*—Stevens, Davis, Miller & Mosher, LLP

(57) ABSTRACT

An electric control system (1) comprises a control unit (4) which comprises a member (5) able to be actuated by a pilot and a means of load-wise protection (7), and which delivers a first deflection order representative of the action exerted by the pilot on the member (5), and of the contribution made by the means of load-wise protection (7), an actuator (11) which moves said control surface (2) about an axis (Z—Z), as a function of a deflection order, and a correction device (12) which comprises a means (13) for determining a second deflection order making it possible to limit the load, to which a stabilizer element of the aircraft is subjected, to a maximum load, and a means (14) for choosing one of the first and second deflection orders, which is transmitted to said actuator (11) so as to move said control surface (2).

13 Claims, 1 Drawing Sheet

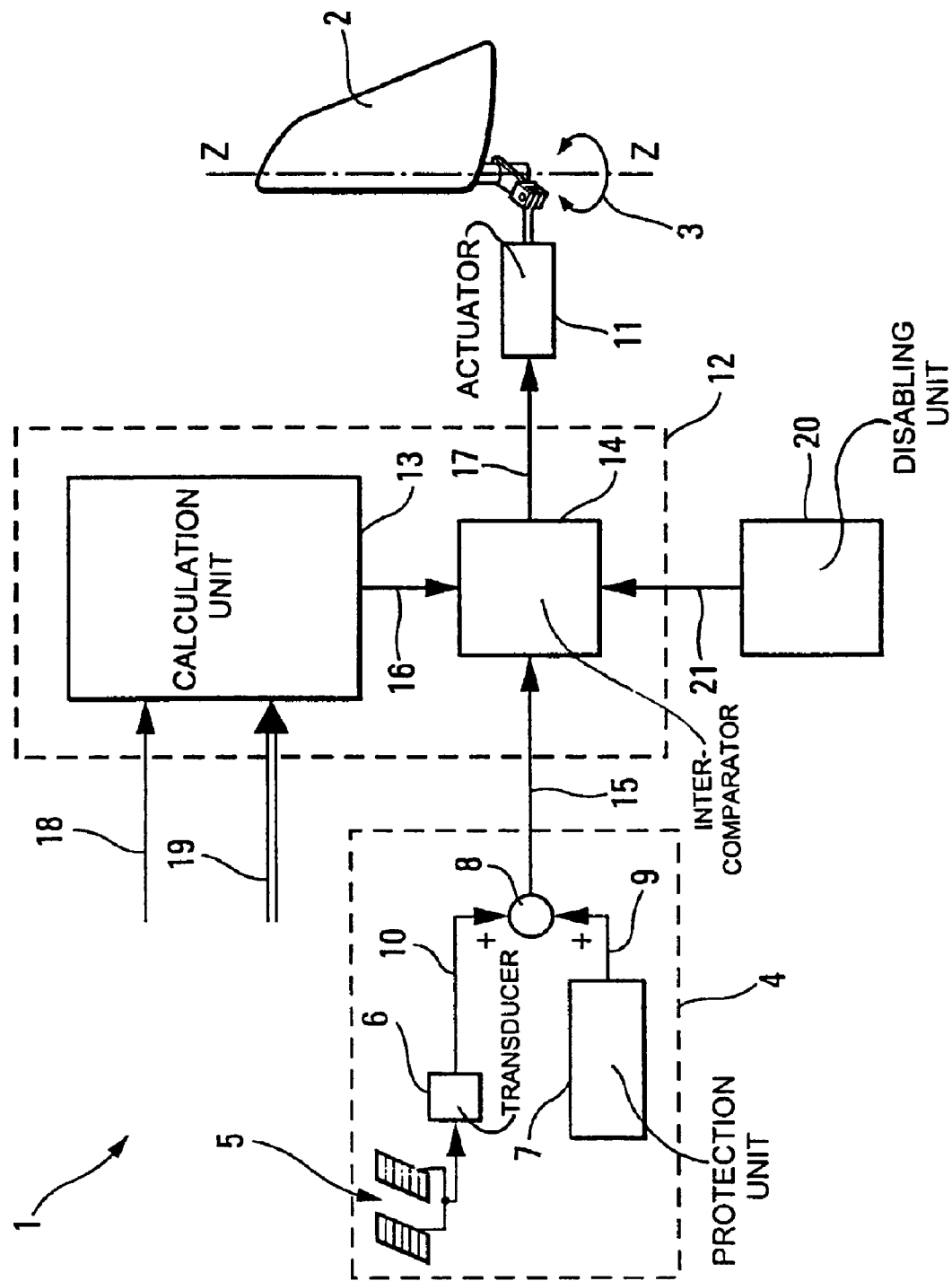

PROCESS AND SYSTEM FOR MOVING A CONTROL SURFACE OF AN AIRCRAFT

The present invention relates to a process and a system for moving a control surface of an aircraft, in particular of a transport airplane.

In order to improve the performance (fuel consumption, noise level, etc.) of an aircraft without decreasing the payload transported, manufacturers are wont to decrease the mass of the aircraft as far as possible, that is to say the mass of the structure, of members, of equipment, etc. of said aircraft. Accordingly, it may be beneficial to decrease the mass of stabilizer elements such as the fin, a horizontal stabilizer or a flying surface for example.

It is known that a stabilizer element of an aircraft is dimensioned by taking account of the maximum loads to which it is liable to be subjected during the various flight configurations of this aircraft. Consequently, in order to limit the mass of such a stabilizer element and hence also the mass of the aircraft, one solution is to reduce the loads to which this stabilizer element is liable to be subjected in the course of a flight.

Accordingly, document FR-2 809 373 from the applicant discloses an electric control system for a steering control surface of an aircraft, by virtue of which it is possible to limit the lateral loadings applied to said steering control surface during maneuvers and hence to reduce the dimensioning and the mass of the latter, without however reducing the aircraft's flight qualities or flight safety.

To do this, said control system comprises:
- a rudder rudder bar actuated by the pilot and associated with a transducer delivering an electric piloting order representative of the action of the pilot on said rudder rudder bar;
- an actuator receiving a control order derived from said piloting order and moving said steering control surface about its axis of rotation; and
- between said rudder rudder bar and said actuator, filtering means of the low-pass type, receiving said piloting order from said transducer and devising said control order for said actuator, the time constant of said filtering means being all the higher as the amplitude of said piloting order corresponds to a larger fraction of the maximum value of travel of the steering control surface.

Thus, this known control system introduces, into the piloting orders to the rudder rudder bar, a nonlinear filtering which depends on the travel available for the steering control surface, this filtering being all the greater as said steering control surface approaches the stops limiting the maximum travel, thereby limiting the loadings applied to said control surface and hence making it possible to reduce the dimensioning and the mass of the latter.

This known control system therefore has the aim of minimizing the loads induced by an abrupt maneuver of the fin, controlled by the pilot. For this purpose, it proceeds to a filtering of the fin deflection order given by the pilot. The amplitude of the filtering is dependent on the amplitude of this deflection order. Said filtering is adjusted identically throughout the flight domain of the airplane, so that the filtering depends on conditions related to the control surface deflection order, but does not depend on the flight conditions of the airplane.

Now, for a given deflection order, the loads induced on the fin may be different depending on the flight conditions of the airplane. It follows from this that said known control system is not optimal in certain cases, in the sense that, under certain flight conditions, it acts less than it could actually act.

The object of the present invention is to remedy these drawbacks. It relates to a process for moving a control surface of an aircraft in such a way as to reduce the induced loads to which a stabilizer element of said aircraft is subjected, said control surface being mounted (on said stabilizer element) rotatably about an axis so as to be able to take any angular position of deflection within a range of travel and being moved in accordance with a deflection order applied thereto, and said aircraft comprising a control unit able to determine a first deflection order as a function of at least the actuation of a control member by a pilot of the aircraft.

Accordingly, said process is noteworthy, according to the invention, in that the following series of successive operations is carried out automatically and repetitively:
a) a first value is determined, dependent on the maximum load to which said stabilizer element may be subjected;
b) a second value is determined, taking into account the actual load to which said stabilizer element is subjected, when said first deflection order determined by said control unit is applied to said control surface;
c) said first and second values are intercompared; and
d) as a function of this comparison:
    if said second value is less than or equal to said first value, said first deflection order is applied to said control surface; and
    if said second value is greater than said first value, a second deflection order is calculated, making it possible to limit the load to which said stabilizer element is subjected to said maximum load, and this second deflection order is applied to said control surface.

Thus, by virtue of the invention, as soon as said second value taking account of the actual load to which the stabilizer element is subjected exceeds said first value dependent on the maximum load, said second deflection order (corrective order) is applied to the control surface, making it possible to limit the load to which said stabilizer element is subjected to said maximum load.

Consequently, regardless of the flight conditions and the maneuvers of the aircraft, the load to which said stabilizer element (a fin, a horizontal stabilizer, a flying surface, etc.) is subjected is always limited to said maximum load, thereby making it possible to remedy the aforesaid drawbacks. It is thus possible, in particular, to reduce the dimensioning and the mass of said stabilizer element.

Furthermore, in contradistinction to the control system described in the aforesaid document FR-2 809 373, the present invention makes provision to detect the flight conditions for which the loads are significant, so as to act on the deflection order, in particular when said loads are highest.

In a first embodiment, said first value corresponds to said maximum load which is predetermined, and said second value corresponds to said actual load.

In this case, advantageously, said actual load Mx is determined from the following expression:

$$Mx = -\frac{1}{2} \cdot \rho \cdot S \cdot V^2 \cdot (Z1 \cdot C1 \cdot \beta r + Z2 \cdot C2 \cdot \delta rmes)$$

in which:
ρ is the density of the air;
S is the surface area of the stabilizer element;
V is the air speed;
Z1 is the lever arm between the center of application of the aerodynamic load due to sideslip and the axis of calculation of the moment;

C1 is a lateral force coefficient, relating to the stabilizer element for the sideslip effect;

βr is the sideslip;

Z2 is the lever arm between the center of application of the aerodynamic load due to the deflection of the control surface and the axis of calculation of the moment;

C2 is a lateral force coefficient, relating to the stabilizer element, as a function of the deflection of the control surface; and δrmes is a measured deflection angle.

In a second preferred embodiment, said first value corresponds to said second deflection order, and said second value corresponds to said first deflection order. This preferred embodiment has the advantage of avoiding high-frequency oscillations which may arise when loads are compared directly (instead of comparing deflection orders).

Advantageously, said second deflection order δrmax, used in step d), is determined from the following expression:

$$\delta r\max = \left[\left(Mx\max / \left(-\frac{1}{2} \cdot \rho \cdot S \cdot V^2\right)\right) - Z1 \cdot C1 \cdot \beta r\right] \cdot [1/(Z2 \cdot C2)]$$

in which:

Mxmax is said maximum load; and

ρ, S, V, Z1, C1, βr, Z2 and C2 are the aforesaid parameters.

Furthermore, advantageously, said maximum load is less than a predetermined percentage of a limit load relating to said stabilizer element.

Additionally, in a particular embodiment, the application of said second deflection order is disabled during at least one particular flight configuration of the aircraft, for which the aforesaid correction in accordance with the invention could bring about a locking of the control surface or a deflection of the latter in the opposite direction to that commanded by the pilot. This could occur, in particular, should there be faults with the sensors employed to measure the various parameters used by the load-wise protection law or when the value of the load threshold Mxmax is too low, that is to say less than the value of the loads which would be induced solely by the sideslip of the airplane under the flight conditions considered.

The present invention also relates to an electric control system for moving a control surface of an aircraft, of the type comprising:

a control unit which comprises at least one control member able to be actuated by a pilot and at least one means of load-wise protection, and which delivers a first deflection order representative, on the one hand, of the action exerted by the pilot on said control member, and, on the other hand, of the contribution made by said means of load-wise protection; and an actuator which moves said control surface about said axis, as a function of a deflection order received.

According to the invention, said control system moreover includes:

a correction device which comprises:

a first means for determining a second deflection order making it possible to limit the load, to which said stabilizer element is subjected, to a maximum load; and a second means, preferably a voter, for choosing one of said first and second deflection orders, which is transmitted to said actuator so as to move said control surface; and possibly, a third means for disabling said correction device.

The single FIGURE of the appended drawing will elucidate the manner in which invention may be embodied. This FIGURE shows the schematic diagram of an electric control system in accordance with the invention.

The electric control system 1, in accordance with the present invention and represented in the FIGURE, is intended for the actuation of an aircraft control surface 2, for example a steering control surface, mounted rotatably in both directions about an axis Z—Z, in the manner symbolized by double arrow 3. Said control surface 2 can take any angular position about said axis Z—Z within a range of travel, extending on either side of the aerodynamically neutral position of said control surface 2.

Said electric control system 1 of an aircraft, for example of a transport airplane, is of the known type, comprising:

a control unit 4 which comprises:

a control member 5, for example a rudder bar or a mini-stick, which is able to be actuated by a pilot of the aircraft, and which is associated with a transducer 6 delivering an electrical control order (relating to the deflection of the control surface 2) representative of the actuation of said control member 5;

a means 7 of load-wise protection, of standard type which delivers an electrical protection order or filtered electrical order (relating to the deflection of the control surface 2), as described for example in the aforesaid document FR-2 809 373 from the applicant; and a summator which is connected by way of links 9 and 10 respectively to said transducer 6 and said means 7 and which computes the sum of said control and protection orders, so as to form a first (electrical) order for deflecting the control surface 2; and a standard actuator 11 which is able to move said control surface 2 about the axis Z—Z as a function of a deflection order received.

According to the invention, in order to limit the loads to which a stabilizer element (for example a fin, a horizontal stabilizer or a flying surface) of the aircraft is subjected as a function of the deflection of the control surface 2, said control surface 2 being mounted rotatably on said stabilizer element (not represented), said control system 1 moreover comprises a correction device 12 which is arranged between the control unit 4 and the actuator 11 and which comprises:

a means of calculation 13 for determining a second (electrical) deflection order making it possible to limit the load to which said stabilizer element is subjected, to a maximum load; and a means 14, for example a voter, which is connected by links 15 and 16 respectively to the summator 8 and to the means of calculation 13, and the object of which is, as specified hereinbelow, to choose from said first deflection order received from the summator 8 and said second deflection order received from the means of calculation 13, that one which it transmits via a link 17 to the actuator 11 so that it moves, in a corresponding manner, said control surface 2.

More precisely, according to the invention, said means 14: intercompares:

a first value dependent on the maximum load, to which said stabilizer element may be subjected; and a second value taking account of the actual load, to which said stabilizer element is subjected when said first deflection order determined by said control unit 4 is applied to said actuator 11; and transmits to said actuator 11, as a function of this comparison;

if said second value is less than or equal to said first value, said first deflection order (received from the control unit 4); and if said second value is greater than said first value, said second deflection order (received from the calculation means 13) making it possible to limit the load, to which said stabilizer element is subjected, to said maximum load.

In a first embodiment, said first value corresponds to said maximum load Mxmax which is, moreover, predetermined, and said second value corresponds to the actual load Mx.

In this case, the correction device 12 determines said actual load Mx from the following expression:

$$Mx = -\frac{1}{2} \cdot \rho \cdot S \cdot V^2 \cdot (Z1 \cdot C1 \cdot \beta r + Z2 \cdot C2 \cdot \delta rmes)$$

in which:
- $\rho$ is the density of the air;
- S is the surface area of the stabilizer element;
- V is the air speed;
- Z1 is the lever arm between the center of application of the aerodynamic load due to sideslip and the axis of calculation of the moment;
- C1 is a lateral force coefficient, relating to the stabilizer element for the sideslip effect;
- $\beta r$ is the sideslip;
- Z2 is the lever arm between the center of application of the aerodynamic load due to the deflection of the control surface 2 and the axis of calculation of the moment;
- C2 is a lateral force coefficient, relating to the stabilizer element, as a function of the deflection of the control surface 2; and
- $\delta rmes$ is a measured deflection angle.

In a second preferred embodiment, that makes it possible to avoid high-frequency oscillations liable to occur with said first embodiment, said first value corresponds to said second deflection order and said second value corresponds to said first deflection order.

In this second embodiment, said means 14 therefore intercompares, directly, the first deflection order received from the control unit 4 and the second deflection order received from the means of calculation 13.

According to the invention, both for said first embodiment and said second embodiment, said means of calculation 13 determines said second deflection order $\delta rmax$ from the following expression:

$$\delta r \max = \left[ \left( Mx\max \Big/ \left( -\frac{1}{2} \cdot \rho \cdot S \cdot V^2 \right) \right) - Z1 \cdot C1 \cdot \beta r \right] \cdot [1/(Z2 \cdot C2)]$$

in which:
- Mxmax is said maximum load;
- $\rho$ is the density of the air;
- S is the surface area of the stabilizer element;
- V is the air speed;
- Z1 is the lever arm between the center of application of the aerodynamic load due to sideslip and the axis of calculation of the moment;
- C1 is the lateral force coefficient, relating to the stabilizer element for the sideslip effect;
- $\beta r$ is the sideslip;
- Z2 is the lever arm between the center of application of the aerodynamic load due to the deflection of the control surface 2 and the axis of calculation of the moment; and
- C2 is the lateral force coefficient, relating to the stabilizer element, as a function of the deflection of the control surface 2.

To do this, said means of calculation 13 receives:
- the value Mxmax of the maximum load, via a link 18; and
- other values ($\rho$, V, ...) of sensors mounted on the aircraft and intended to measure these values, as is illustrated by an overall link 19 in the FIGURE.

Within the framework of the present invention, said maximum load Mxmax is chosen equal to a value which is less than a predetermined percentage, for example 10% or 20%, of a limit load relating to said stabilizer element. For example, it is possible to chose a value which is 10% below the level of the envelope of the extreme loadings. This value may, moreover, be adjusted during trial flights.

Additionally, said control system 1 also comprises a disabling means 20 which is connected by a link 21 to the means 14 so as to disable, during the application of the second deflection order, said protection device 12, that is to say so as to remove the application of said second deflection order and impose the application of the first deflection order, but doing so only under certain very particular and infrequent flight conditions, specified hereinbelow.

Specifically, under certain (rare) flight conditions, the aforesaid correction implemented by the correction device 12, could bring about a locking of the control surface 2 or a deflection of the latter in the opposite direction to that commanded by the pilot. This could occur, in particular, should there be faults with the sensors employed to measure the various parameters used by the load-wise protection law or when the value of the load threshold Mxmax is too low, that is to say less than the value of the loads which would be induced solely by the sideslip of the airplane under the flight conditions considered.

The information which makes it possible to detect undesirable phenomena such as these is, in particular,
- the departure of the control surface 2 in the reverse direction to the order of the pilot;
- a constant deflection for too long a time span, while the pilot directive is in a dynamic phase;
- the deflection of the control surface 2 tending to deviate from the pilot directive position, while this directive is not in the dynamic regime with too significant a slope or for too long a time span.

The disabling means 20 can detect these phenomena, using as information for example the inputs for the pilot directive (link 10) and for the deflection of the control surface 2 (link 17).

It will be noted that the system 1 in accordance with the invention (and in particular the correction device 12):
- acts in an effective manner on the reduction in the load peaks due to fast movements of the control surface 2. It will be noted by way of nonlimiting example that it is possible to obtain, in practice, as a function in particular of the airplane and of the flight domain envisaged, a reduction in the load peaks of 20% for the application to a steering control surface and a fin (stabilizer element). More precisely, on a wide-bodied civil transport airplane, one can expect a reduction in the limit loadings during flexion of the fin of 20% which, allied with the induced reduction in the loads applied to the rear fuselage, may allow a saving of around 250 kg, i.e. a gain of two additional passengers on board. This reduction acts in such a way as to soften the transient phases. In this case, there is almost no repercussion on the flight mechanics. It will be noted, furthermore, that instead of using the invention to decrease the weight of the fin, it is also possible to use it to warn against more significant loads than those chosen for the dimensioning calculations for the airplane;

is inexpensive and simple to embody. In particular, it requires no additional sensors other than those generally existing on aircraft; and may be applied to any type of stabilizer element of the aircraft.

What is claimed is:

1. A process for moving a control surface of an aircraft in such a way as to reduce the induced loads to which a stabilizer element of said aircraft is subjected, said control surface being mounted rotatably about an axis so as to be able to take any angular position of deflection within a range of travel and being moved in accordance with a deflection order applied thereto, and maid aircraft comprising a control unit able to determine a first deflection order as a function of at least the actuation of a control member by a pilot of the aircraft, wherein the following series of successive operations is carried out automatically and repetitively:

a) a first value is determined, dependent on the maximum load to which said stabilizer element may be subjected;

b) a second value is determined, taking into account the actual load to which said stabilizer element is subjected, when said first deflection order determined by said control unit is applied to said control surface;

c) said first and second values are intercompared; and d) as a function of this comparison:
if said second value is less than or equal to said first value, said first deflection order is applied to said control surface; and
if said second value is greater than said first value, a second deflection order is calculated, making it possible to limit the load to which said stabilizer element is subjected to said maximum load, and this second deflection order is applied to said control surface, wherein:

said first value corresponds to said maximum load which is predetermined, said second value corresponds to said actual load, and said actual load Mx is determined from the following expression:

$$Mx = -\frac{1}{2} \cdot \rho \cdot S \cdot V^2 \cdot (Z1 \cdot C1 \cdot \beta r + Z2 \cdot C2 \cdot \delta rmes)$$

in which:

$\rho$ is the density of the airs

S is the surface area of the stabilizer element;

V is the air speed;

Z1 is the lever arm between the center of application of the aerodynamic load due to sideslip and the axis of calculation of the moment;

C1 is a lateral force coefficient, relating to the stabilizer element for the sideslip effect;

$\beta r$ is the sideslip;

Z2 is the lever arm between the center of application of the aerodynamic load due to the deflection of the control surface and the axis of calculation of the moment;

C2 is a lateral force coefficient, relating to the stabilizer element, as a function of the deflection of the control surface; and $\delta rmes$ is a measured deflection angle.

2. The process as claimed in claim 1, wherein said second deflection order $\delta rmax$ is determined from the following expression:

$$\delta r\max = \left[ \left( Mx\max \Big/ \left( -\frac{1}{2} \cdot \rho \cdot S \cdot V^2 \right) \right) - Z1 \cdot C1 \cdot \beta r \right] \cdot [1/(Z2 \cdot C2)]$$

in which:

Mxmax is said maximum load;

$\rho$ is the density of the air;

S is the surface area of the stabilizer element;

V is the air speed;

Z1 is the lever arm between the center of application of the aerodynamic load due to sideslip and the axis of calculation of the moment;

C1 is a lateral force coefficient, relating to the stabilizer element for the sideslip effect;

$\beta r$ is the sideslip;

Z2 is the lever arm between the center of application of the aerodynamic load due to the deflection of the control surface and the axis of calculation of the moment; and C2 is a lateral force coefficient, relating to the stabilizer element, as a function of the deflection of the control surface.

3. The process as claimed in claim 1, wherein said maximum load is less than a predetermined percentage of a limit load relating to said stabilizer element.

4. The process as claimed in claim 1, wherein the application of said second deflection order is disabled during at least one particular flight configuration of the aircraft.

5. A process for moving a control surface of an aircraft in such a way as to reduce the induced loads to which a stabilizer element of said aircraft is subjected, said control surface being mounted rotatably about an axis so as to be able to take any angular position of deflection within a range of travel and being moved in accordance with a deflection order applied thereto, and said aircraft comprising a control unit able to determine a first deflection order as a function of at least the actuation of a control member by a pilot of the aircraft, wherein the following series of successive operations is carried out automatically and repetitively:

a) a first value is determined, dependent on the maximum load to which said stabilizer element may be subjected;

b) a second value is determined, taking into account the actual load to which said stabilizer element is subjected, when said first deflection order determined by said control unit is applied to said control surface;

c) said first and second values are intercompared; and d) as a function of this comparison:
if said second value is less than or equal to said first value, said first deflection order is applied to said control surface, and
if said second value is greater than said first value, a second deflection order is calculated, making it possible to limit the load to which said stabilizer element is subjected to said maximum load, and this second deflection order is applied to said control surface, wherein:

said first value corresponds to said second deflection order, said second value corresponds to said first deflection order, and said second deflection order δrmax is determined from the following expression:

$$\delta r\max = \left[\left(Mx\max \Big/\left(-\frac{1}{2}\cdot\rho\cdot S\cdot V^2\right)\right) - Z1\cdot C1\cdot \beta r\right]\cdot [1/(Z2\cdot C2)]$$

in which:
Mxmax is said maximum load;
$\rho$ is the density of the air;
S is the surface area of the stabilizer element;
V is the air speed;
Z1 is the lever arm between the center of application of the aerodynamic load due to sideslip and the axis of calculation of the moment;
C1 is a lateral force coefficient, relating to the stabilizer element for the sideslip effect;
$\beta r$ is the sideslip;
Z2 is the lever arm between the center of application of the aerodynamic load due to the deflection of the control surface and the axis of calculation of the moment; and
C2 is a lateral force coefficient, relating to the stabilizer element, as a function of the deflection of the control surface.

6. The process as claimed in claim 1, wherein said maximum load is less than a predetermined percentage of a limit load relating to said stabilizer element.

7. The process as claimed in claim 1, wherein the application of said second deflection order is disabled during at least one particular flight configuration of the aircraft.

8. An electric control system for moving a control surface of an aircraft, said control surface being mounted rotatably about an axis so as to be able to take any angular position of deflection within a range of travel, and said system comprising:
a control unit which comprises at least one control member able to be actuated by a pilot and at least one means of load-wise protection, and which delivers a first deflection order representative, on the one hand, of the action exerted by the pilot on said control member, and, on the other hand, of the contribution made by said means of load-wise protection; and
an actuator which moves said control surface about said axis, as a function of a deflection order received,
which system moreover includes a correction device which comprises:
a first means for determining a second deflection order making it possible to limit the load, to which maid stabilizer element is subjected, to a maximum load; and
a second means for choosing one of said first and second deflection orders, which is transmitted to said actuator so as to move said control surface, said second means intercomparing:
a first value dependent on the maximum load, to which said stabilizer element may be subjected; and
a second value taking account of the actual load, to which said stabilizer element is subjected when maid first deflection order determined by said control unit is applied to said actuator,
and said second means transmitting to said actuator, as a function of this comparison:
if said second value is less than or equal to said first value, said first deflection order; and
if said second value is greater than said first value, said second deflection order making it possible to limit the load, to which said stabilizer element is subjected, to said maximum load, wherein:
said first value corresponds to said maximum load which is predetermined,
said second value corresponds to said actual load, and
said actual load Mx is determined from the following expression:

$$Mx = -\frac{1}{2}\cdot\rho\cdot S\cdot V^2 \cdot (Z1\cdot C1\cdot \beta r + Z2\cdot C2\cdot \delta rmes)$$

in which:
$\rho$ is the density of the air;
S is the surface area of the stabilizer element;
V is the air speed;
Z1 is the lever arm between the center of application of the aerodynamic load due to sideslip and the axis of calculation of the moment;
C1 is a lateral force coefficient, relating to the stabilizer element for the sideslip effect;
$\beta r$ is the sideslip;
Z2 is the lever arm between the center of application of the aerodynamic load due to the deflection of the control surface and the axis of calculation of the moment;
C2 is a lateral force coefficient, relating to the stabilizer element, as a function of the deflection of the control surface; and
δrmes is a measured deflection angle.

9. The system as claimed in claim 8, wherein said second means is a voter.

10. The system as claimed in claim 8, which system moreover comprises a third means for disabling said correction device.

11. An electric control system for moving a control surface of an aircraft, said control surface being mounted rotatably about an axis so as to be able to take any angular position of deflection within a range of travel, and said system comprising:
a control unit which comprises at least one control member able to be actuated by a pilot and at least one means of load-wise protection, and which delivers a first deflection order representative, on the one hand, of the action exerted by the pilot on said control member, and, on the other hand, of the contribution made by said means of load-wise protection; and
an actuator which moves maid control surface about said axis, as a function of a deflection order received,
which system moreover includes a correction device which comprises:
a first means for determining a second deflection order making it possible to limit the load, to which said stabilizer element is subjected, to a maximum load; and
a second means for choosing one of said first and second deflection orders, which is transmitted to said actuator so as to move said control surface, said second means intercomparing:
a first value dependent on the maximum load, to which said stabilizer element may be subjected; and
a second value taking account of the actual load, to which said stabilizer element is subjected when said first deflection order determined by said control unit is applied to said actuator, and said second means transmitting to said actuator, as a function of this comparison:
  if said second value is less than or equal to said first value, said first deflection order; and
  if said second value is greater than said first value, said second deflection order making it possible to limit the load, to which said stabilizer element is subjected, to said maximum load, wherein:
said first value corresponds to said second deflection order,
said second value corresponds to said first deflection order, and
said second deflection order δrmax is determined from the following expression:

$$\delta r\max = \left[\left(Mx\max \Big/ \left(-\frac{1}{2} \cdot \rho \cdot S \cdot V^2\right)\right) - Z1 \cdot C1 \cdot \beta r\right] \cdot [1/(Z2 \cdot C2)]$$

in which:
  Mxmax is said maximum load;
  ρ is the density of the air;
  S is the surface area of the stabilizer element;
  V is the air speed;
  Z1 is the lever as between the center of application of the aerodynamic load due to sideslip and the axis of calculation of the moment;
  C1 is a lateral force coefficient, relating to the stabilizer element for the sideslip effect;
  βr is the sideslip;
  Z2 is the lever arm between the center of application of the aerodynamic load due to the deflection of the control surface and the axis of calculation of the moment; and
  C2 is a lateral force coefficient, relating to the stabilizer element, as a function of the deflection of the control surface.

12. The system as claimed in claim 11, wherein said second means is a voter.

13. The system as claimed in claim 11, which system moreover comprises a third means for disabling said correction device.

* * * * *